Figure 1:
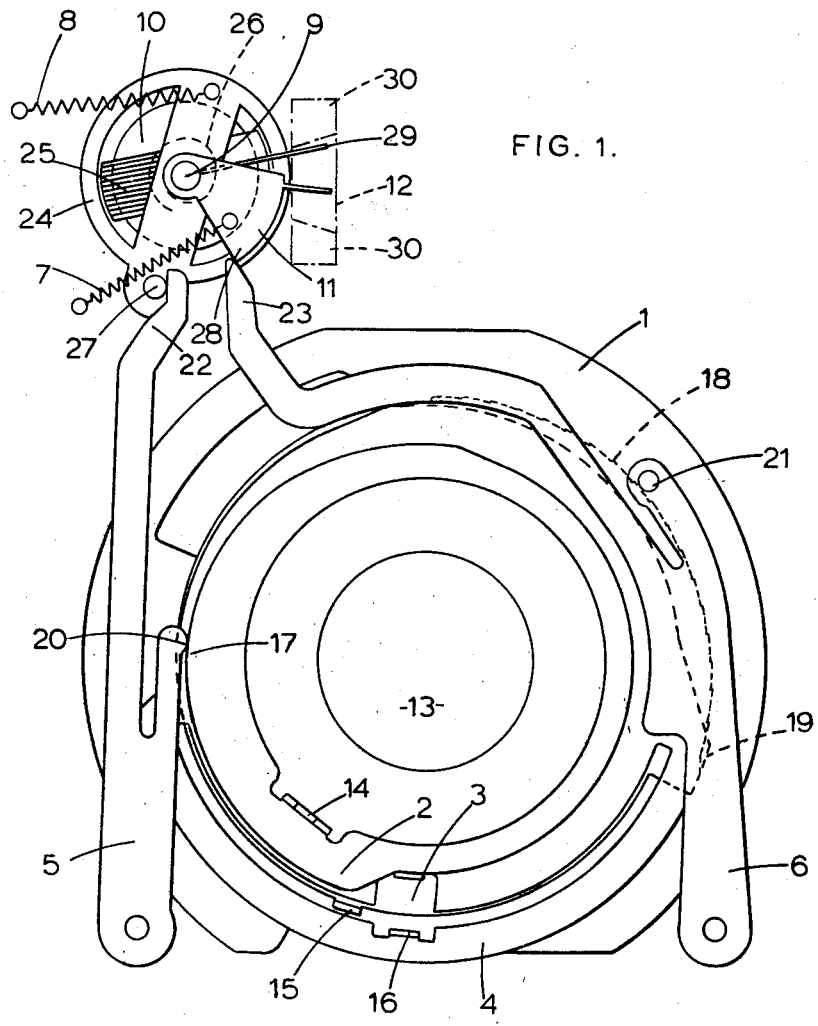

April 24, 1962  E. BERGER ET AL  3,030,871
PHOTOGRAPHIC CAMERA
Filed March 7, 1960  2 Sheets-Sheet 1

INVENTORS
EDITH BERGER
WERNER HAHN
KARL KRÖMER
By Irvin S. Thompson
ATTY.

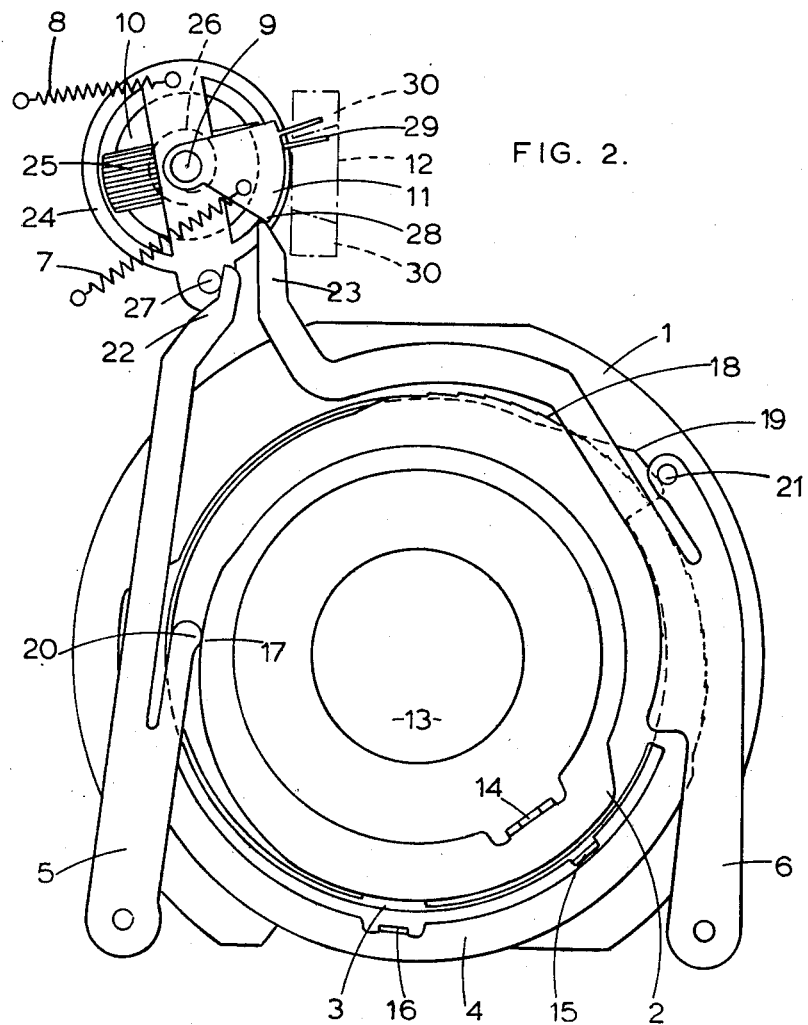

United States Patent Office 3,030,871
Patented Apr. 24, 1962

3,030,871
PHOTOGRAPHIC CAMERA
Edith Berger and Werner Hahn, Dresden, and Karl Krömer, Radebeul, Germany, assignors to VEB Kamera- und Kinowerke Dresden, Dresden, Germany
Filed Mar. 7, 1960, Ser. No. 13,216
2 Claims. (Cl. 95—10)

The present invention relates to a photographic camera having a between-the-lens shutter, the setting elements of which for diaphragm and exposure time are coupled with an exposure meter.

Known arrangements of this type were suitable for those types of shutters which not only possessed geometrically progressing rows of figures over linearly divided scales for the exposure factors to be set such as diaphragm and exposure time, but also required conformity of the interval values of the scales with one another. More especially however above all in the case of automatic shutters the intervals of the exposure time setting element are substantially greater than those of the diaphragm setting element, which arises as is known as a consequence of the exposure time being regulated by different spring tensions.

Thus in this case special transformation members would be necessary which compensate the different adjustment distances per setting value of the setting elements. However the requisite space is not available for this purpose in between-the-lens shutters, nor would this require a disproportionately great expenditure on structural parts and working time.

The task of the invention is the provision of an arrangement which, despite the existence of different divisions of the setting scales from one another, possesses the desired connection between shutter and exposure meter, without the above-mentioned disadvantageous expenditure being necessary.

According to the invention this is achieved due to the fact that with each of the setting elements for exposure time and diaphragm mounted in the between-the-lens shutter there is associated a control lever which levers are rotated by control cams provided on the setting elements, and transmit this rotational movement on the one hand to adjustable parts of the exposure meter and on the other hand to a follow-up pointer. For reasons of space the control levers are preferably so constructed that they extend around the light passage aperture of the shutter in crescent form. In accordance with a special feature of the invention the control cam of at least one setting element is provided with a projection extending out of the continuous course of the cam, so that on the setting of a value no longer adjustable by the shutter mechanism either the follow-up pointer or the instrument pointer is pivoted out of the visible range of a reading-off window. With the control lever possessing the aforementioned projection there is expediently connected, for securing in various relative positions, a correction member for taking into consideration further exposure factors such for example as the film sensitivity, which member is itself constructed as a control cam, while the setting element possesses a projection extending over the course of the control cam.

The details of the invention may be seen from the example of embodiment as described and represented hereinafter.

FIGURE 1 shows the new arrangement in the case of the normal style of operation; and FIGURE 2 shows the new arrangement with the follow-up pointer pivoted out.

In the shutter housing 1 provided with the light-passage aperture 13 there are rotatably mounted the diaphragm setting element 2 and the time-setting element 3. To both setting elements there may be allocated scales divided according to desire. With the time-setting element 3 the correction member 4 for film sensitivities is adjustably connected so that it can be secured to the element 3 in various relative positions. The two setting elements 2 and 3 and the correction member 4 are provided with lugs 14, 15 and 16, so that these members are couplable with setting handles arranged on the camera side, which are not specially represented. The diaphragm-setting element 2 possesses the control cam 17, while to the correction member 4 which is connected to the time-setting element 3 there is allocated the control cam 18. The projection 19 of the time-setting element 3 extends over the control cam 18.

The control levers 5 and 6, mounted in the camera housing which is not shown in greater detail, rest with their resilient arms 20 and 21 on the control cams 17 and 18. Through the arms 22 and 23 the control levers 5 and 6 are in engagement with an exposure mechanism 10. The system carrier, rotatably mounted on the shaft 9 and holding one end of the return spring 26 of the moving coil 25 and at the same time forming the return ring 24, is constantly drawn by the spring 8 with the pin 27 against the control lever 5. About the shaft 9 the follow-up pointer 11 is also rotatably mounted, which under the action of the spring 7 grasps the arm 23 of the control lever 6 with the edge 28, and constitutes an operative connection between the arm 21 of the control lever 6 and the control cam 18.

The instrument pointer 29 is visible together with the follow-up pointer 11 in the window 12, the blackened areas 30 of which indicate the range in which an automatic setting of the exposure factors is no longer possible. This is the case especially when the projection 19 of the time-setting element 3 engages the pin 21 of the control lever 6 (see FIGURE 2), so that the follow-up pointer 11 is pivoted into one of the blackened areas 30; by rotation of the time-setting element a value has been set which can no longer be automatically adjusted by the shutter (for example "B").

We claim:

1. In a photographic camera including a between-the-lens shutter device having an aperture diaphragm, a pivoted blade shutter, a timing device for controlling the exposure time of the shutter, a first setting element for setting the diaphragm aperture, a second setting element, coaxial with said first setting element, for setting the timing device and a third setting element arranged coaxially with said first and second setting elements, for setting a further exposure factor, and an exposure meter having a moving coil with a pointer attached thereto, resilient means operatively connected to the moving coil for restraining the rotational movement thereof, movable means for varying the restraining effect of the resilient means and a follow-up pointer, the provision of a first control cam provided on the first setting element, a first control lever pivotally mounted in the shutter device, which first lever has a cam follower in engagement with said first control cam and is operatively connected to said movable means, a second control cam provided on said third setting element, a second control lever pivotally mounted in the shutter device, which second lever has a cam follower in engagement with said second control cam and operatively connected to said follow-up pointer, and a projection provided on said second setting element extending radially to a greater distance from the axis of the setting elements than any point on said second control cam, which projection is engageable with the cam follower on said second lever, said second setting-element being rotatable to a position where the cam follower on the second lever is engaged by the projection and is disengaged from said second control cam.

2. A photographic camera according to claim 1, wherein there is provided means for connecting the second and third setting elements to each other at any desired rotational position in relation to each other, so as to be rotatable together.

References Cited in the file of this patent
UNITED STATES PATENTS

| | | |
|---|---|---|
| 2,250,898 | Tonnies | July 29, 1941 |
| 2,340,622 | Simmon | Feb. 1, 1944 |
| 2,341,393 | Simmon | Feb. 8, 1944 |
| 2,418,370 | Simmon | Apr. 1, 1947 |
| 2,920,542 | Engelsmann | Jan. 12, 1960 |